United States Patent [19]

Lovett

[11] Patent Number: 5,802,578
[45] Date of Patent: Sep. 1, 1998

[54] MULTINODE COMPUTER SYSTEM WITH CACHE FOR COMBINED TAGS

[75] Inventor: Thomas D. Lovett, Portland, Oreg.

[73] Assignee: Sequent Computer Systems, Inc., Beaverton, Oreg.

[21] Appl. No.: 662,380

[22] Filed: Jun. 12, 1996

[51] Int. Cl.$^6$ .................................................. G06F 13/16
[52] U.S. Cl. ............................ 711/147; 711/144; 711/141
[58] Field of Search ............................. 395/474, 475, 395/468, 471, 472; 711/147, 148, 141, 144, 145

[56] References Cited

U.S. PATENT DOCUMENTS 5,522,058  5/1996  Iwasa et al. ............................. 711/145

*Primary Examiner*—Eddie P. Chan
*Assistant Examiner*—Kevin L. Ellis
*Attorney, Agent, or Firm*—Klarquist Sparkman Campbell Leigh & Whinston, LLP

[57] ABSTRACT

Local memory on a node in a multinode, multiprocessor computer system with distributed shared memory and a remote cache is efficiently updated through the use of a combined tag stored in a tag cache. In response to a local processor request for access to local memory that does not contain a current copy of the data requested, a combined tag is formed from a memory tag and a remote cache tag. The combined tag allows the node to operate in accordance with the network protocol such as the Scalable Coherent Interface (SCI) while the memory is being updated, acting as memory in response to requests from other nodes to the memory and as a cache in response to requests from other nodes to the remote cache. In this way the memory is updated quickly and the remote cache is not required to store data that is better stored in the local memory.

20 Claims, 7 Drawing Sheets

MULTINODE COMPUTER SYSTEM WITH CACHE FOR COMBINED TAGS

FIELD OF THE INVENTION

This invention relates generally to computer architecture. More particularly, this invention relates to a multinode computer system that utilizes distributed shared memory.

BACKGROUND OF THE INVENTION

Multiprocessor computers by definition contain multiple processors that can execute multiple parts of a computer program or multiple programs simultaneously. In general this parallel computing executes computer programs faster than conventional single processor computers, such as personal computers (PCs), that execute the parts of a program sequentially. The actual performance advantage is a function of a number of factors, including the degree to which parts of a program can be executed in parallel and the architecture of the particular multiprocessor computer at hand.

Multiprocessor computers may be classified by how they share information among the processors. Shared-memory multiprocessor computers offer a common memory address space that all processors can access. Processes within a program communicate through shared variables in memory which allow them to read or write to the same memory location in the computer. Message passing multiprocessor computers, on the other hand, have a separate memory space for each processor. Processes communicate through messages to each other.

Multiprocessor computers may also be classified by how the memory is physically organized. In distributed memory computers, the memory is divided into modules physically placed near each processor. This placement provides each processor with faster access time to its local memory. By contrast, in centralized memory computers, the memory is physically located in just one location, generally equally distant in time and space from each of the processors. Both forms of memory organization use high-speed cache memory in conjunction with main memory to reduce execution time.

Multiprocessor computers with distributed shared memory are often organized into nodes with one or more processors per node. Also included in the node are local memory for the processors, a remote cache for caching data obtained from memory in other nodes, and logic for linking the node with other nodes in the computer. A processor in a node communicates directly with the local memory and communicates indirectly with memory on other nodes through the remote cache. For example, if the desired data is in local memory, a processor obtains the data directly from local memory. But if the desired data is stored in memory in another node, the processor must access its remote cache to obtain the data. A cache hit occurs if the data has been obtained recently and is presently stored in the cache. Otherwise a cache miss occurs, and the processor must obtain the desired data from the local memory in another node through the linking logic.

Data coherency is maintained among the multiple caches and memories of a multiprocessor computer through a cache coherency protocol, such as the protocol described in the Scalable Coherent Interface (SCI) (IEEE 1596). However, the present SCI coherency protocol for multiprocessor computers with distributed shared memory uses the remote cache inefficiently, resulting in unnecessary cache misses. Cache memory is typically more expensive and more scarce than local memory. Yet the SCI protocol stores data in a node's remote cache which could just as well be stored in the node's local memory. Storing such data in the local memory frees up the remote cache for storing data not suitable for the local memory, such as data from memory on a remote node. This inefficiency arises because the SCI protocol does not provide a mechanism that allows local memory to request a modified copy of its data to be returned to it from a remote node. The only mechanisms defined are those that allow a cache to request the modified copy. The typical approach therefore to bringing a modified copy of data back to the home node is to have the node's remote cache request the data through the normal cache protocol. The returned data is then written into the home node's remote cache, unnecessarily filling it and causing cache misses to occur more frequently. If the returned data is instead written into its place in the local memory, space in the remote cache remains free. But this approach also has a drawback. The local memory must then provide sufficient state storage for each data line to allow the lines to behave the way the cache protocol requires. Since the state required for each cache line is typically much larger than the state required for each memory line, storing the returned data in local memory requires an excessive amount of state storage.

An example illustrates the problem with present cache protocols and efficient cache usage. Assume that a processor in a second node needs access to data stored in local memory in a first node. The second node's processor accesses the first node's local memory and stores the data in the second node's remote cache where the data is now available locally in the second node. Assume that the second node's processor, in the process of using this data, changes it and stores the updated data in the second node's remote cache. Assume now that a processor in the first node desires access to the data. The first node's processor requests the data from its local memory since that is the address for the data. The linking logic on the node immediately detects that the data has been changed by second node's processor and that the data stored in the first node's local memory is no longer valid. The first node's processor in response accesses the second node's remote cache to obtain a copy of the valid data and places it in the first node's remote cache. Consequently, data which could be stored in the first node's local memory is instead stored in the first node's remote cache. More cache misses and more data replacement activity will subsequently occur as the first node's remote cache fills with local memory data. Yet under present cache protocols, the first node's local memory is not updated until a cache miss occurs and the updated data is written back to the local memory according to the cache's block replacement algorithm.

An objective of the invention, therefore, is to improve the performance of multiprocessor computers with shared distributed memory by reducing the number of cache misses within a node. Another objective of the invention is to reduce the number of cache misses by updating a node's local memory rather than storing the data in the node's remote cache. Yet another objective of the invention is to update the local memory without excessive state storage on the node.

SUMMARY OF THE INVENTION

A method of updating data stored in local memory of a home node when the valid data is stored in a remote node includes combining a cache tag and a memory tag to form a combined tag, and then storing the combined tag in a tag cache. The combining of tags may follow a request from the home node to a remote node to send a copy of the valid data.

While the request is pending, the combined tag is modified to reflect current states of the local memory and remote cache. For example, the memory tag portion of the combined tag may be modified to point to the home node as the head of a sharing list, and the cache tag portion may be modified to indicate a cache state in which the home node is obtaining the valid data. Then in response to a request from a remote node to the home node while the data is being updated, the combined tag provides the requested information, allowing the node to act both as a local memory and as a remote cache as required while operating in accordance with the network protocol.

In a preferred embodiment of the invention, the multinode computer includes a protocol engine for combining the memory and cache tags to form the combined tag. It also includes a tag cache for storing a limited number of combined tags. The protocol engine may include a cache controller and a memory controller or other elements that carry out the described functions.

The foregoing and other objects, features, and advantages of the invention will become more apparent from the following detailed description of a preferred embodiment which proceeds with reference to the following drawings.

DETAILED DESCRIPTION OF A PREFERRED EMBODIMENT

Figure 1:
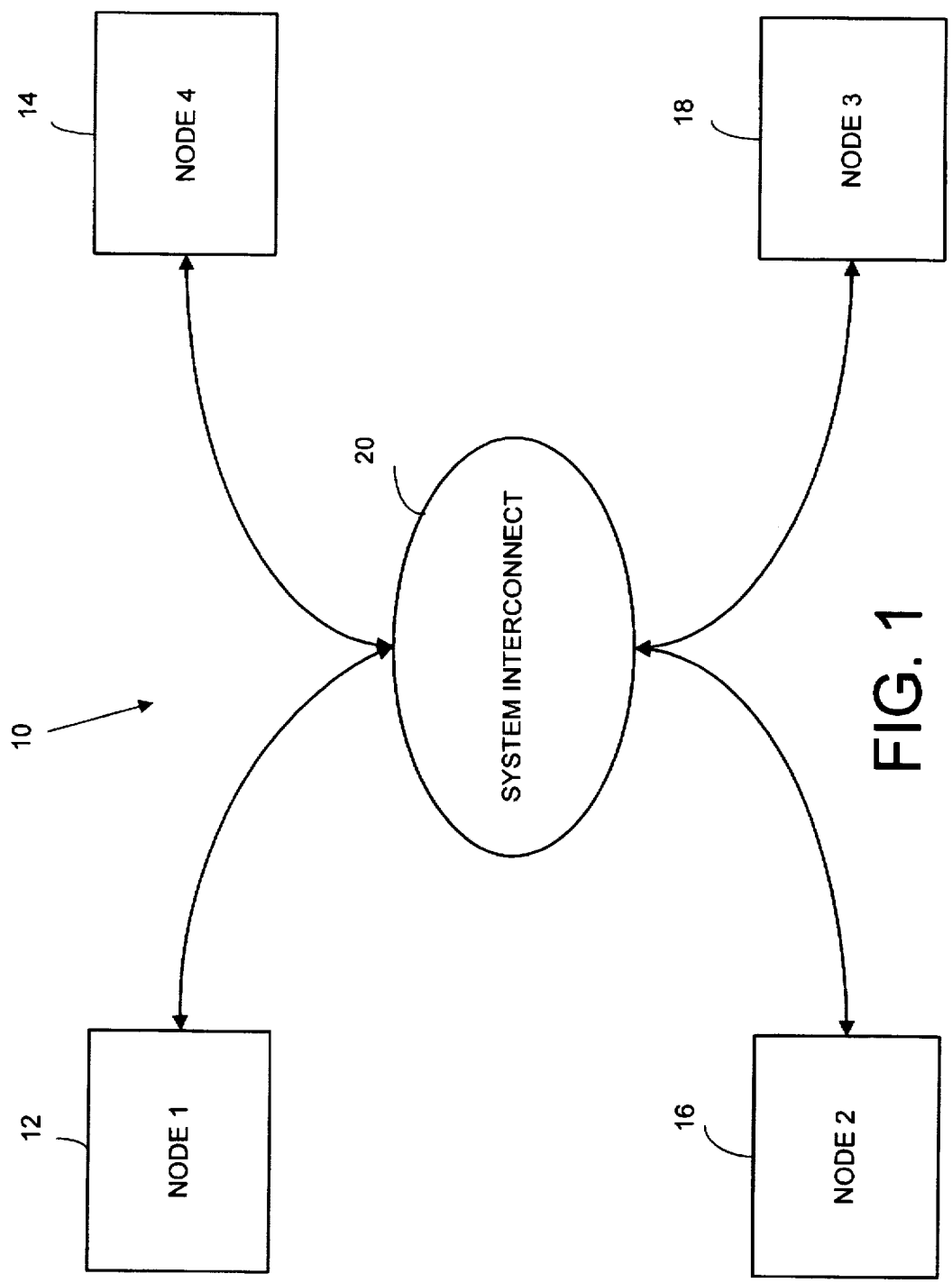
FIG. 1 is a block diagram of a multinode, multiprocessor computer system in accordance with the invention.

FIG. 1 is a block diagram of a multinode, multiprocessor computer system 10 in accordance with the invention. System 10 uses a computer architecture based on Distributed-Shared Memory (DSM). Four nodes 12–18 are shown connected by a system interconnect 20 that permits any node to communicate with any other node. Specifically, the purpose of interconnect 20 is to allow processors in any node to access the memory resident in any other node with cache coherency guaranteed. System interconnect 20 is a switch-based network that uses the Scalable Coherent Interface (SCI) interconnection mechanism. SCI is an IEEE-approved standard, or protocol (1596), well documented in a number of publications including *IEEE Std 1596–1992* (2 August 1993) and *Multiprocessor interconnection using SCI*, a Master Thesis by Ivan Tving, DTH ID-E 579 (1994), both of which are hereby incorporated by reference.

The physical links of interconnect 20 provide high bandwidth and low latency and are scalable to allow for the addition of more nodes. Links that meet these requirements include point-to-point interconnects with a data throughput of one gigabit/second or greater. The links can be configured in any number of suitable ways for connecting nodes 12–18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report #1058*, University of Wisconsin-Madison.

Figure 2:
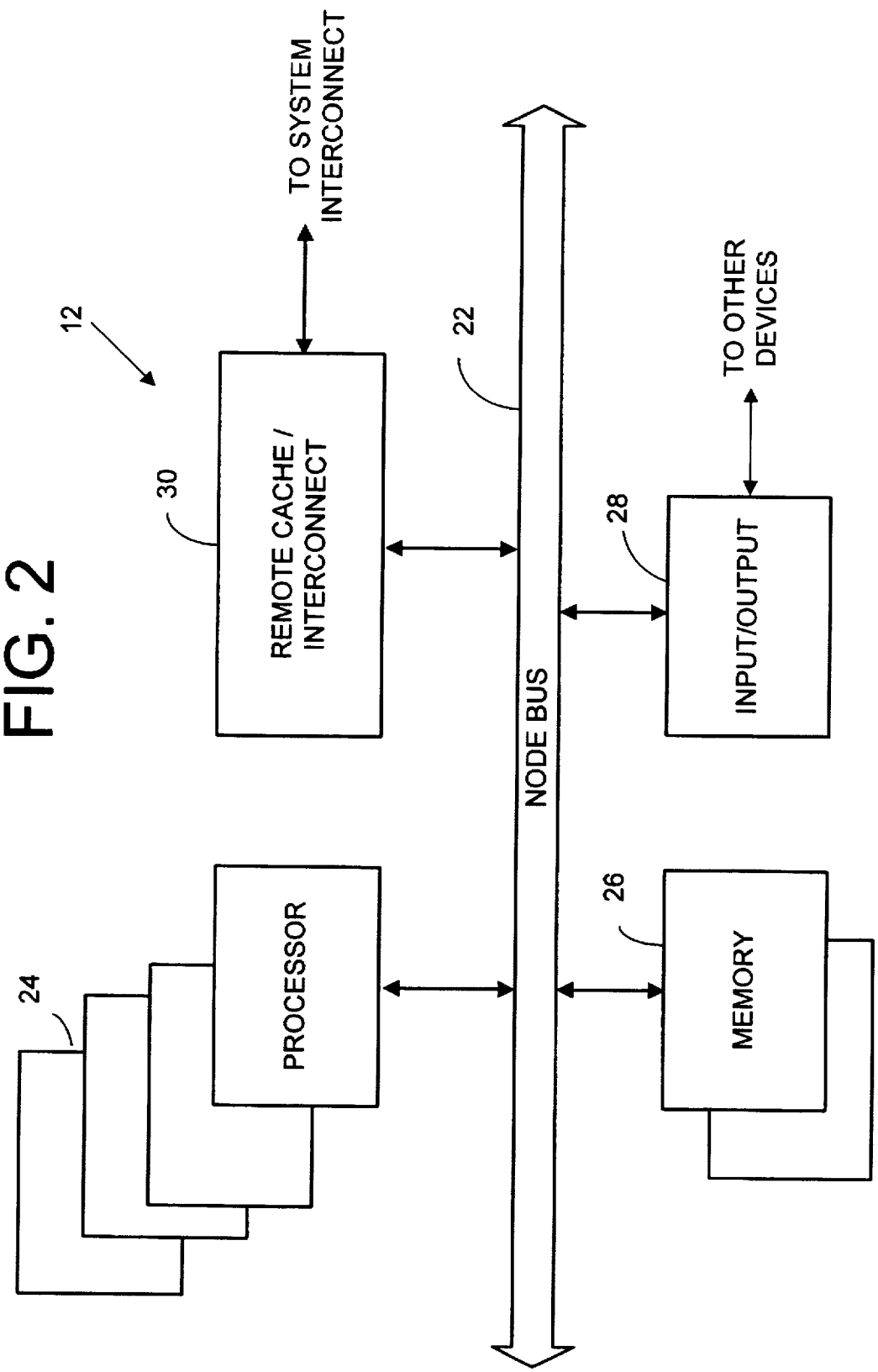
FIG. 2 is a block diagram of one of the nodes of the computer system of FIG. 1.

A block diagram of node 12 of system 10 is shown in FIG. 2. The node includes a conventional symmetrical multiprocessor (SMP) node bus 22 for connecting multiple data processors 24 to local memory 26. For clarity, node 12–18 may be referred to as home nodes or remote nodes in certain circumstances. A home node is one whose local memory stores a memory block of interest (i.e., the address of the memory block falls within the address range supported by the local memory); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O may be of conventional design and includes means for connecting the node (and hence system 10) to personal computers, local area networks, etc., that wish to utilize the power of the multinode computer system. To connect node 12 to the other nodes in the system, the node includes an interconnect device 30. The device forms part of system interconnect 20 along with the physical links between nodes and the same devices on the other nodes of the computer system 10. In the present embodiment device 30 is constructed to implement the SCI standard for data communication between the nodes, allowing a processor on one node to access data stored on another node. Node 30 also contains a remote cache in the present embodiment, although this combination is not required for the invention. The remote cache could as well be separate from the interconnect device.

Figure 3:
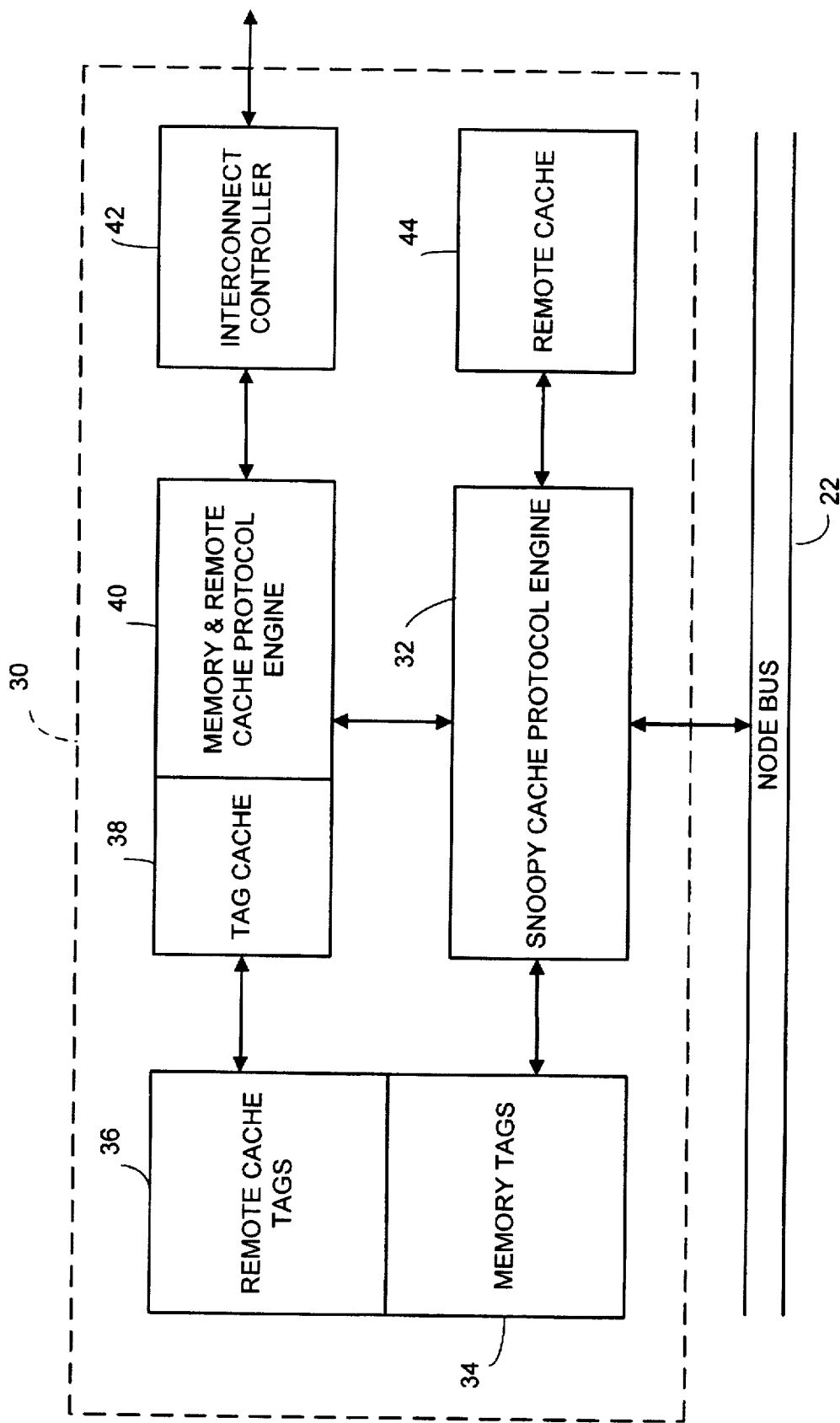
FIG. 3 is a block diagram of an interconnect device within the node of FIG. 2.

FIG. 3 is a block diagram showing the interconnect device 30 in more detail. The device includes a snoopy cache protocol engine 32; storage for memory and remote cache tags 34 and 36; a tag cache 38; a memory & remote cache protocol engine 40; an interconnect controller 42; and a remote cache 44.

Figure 4:
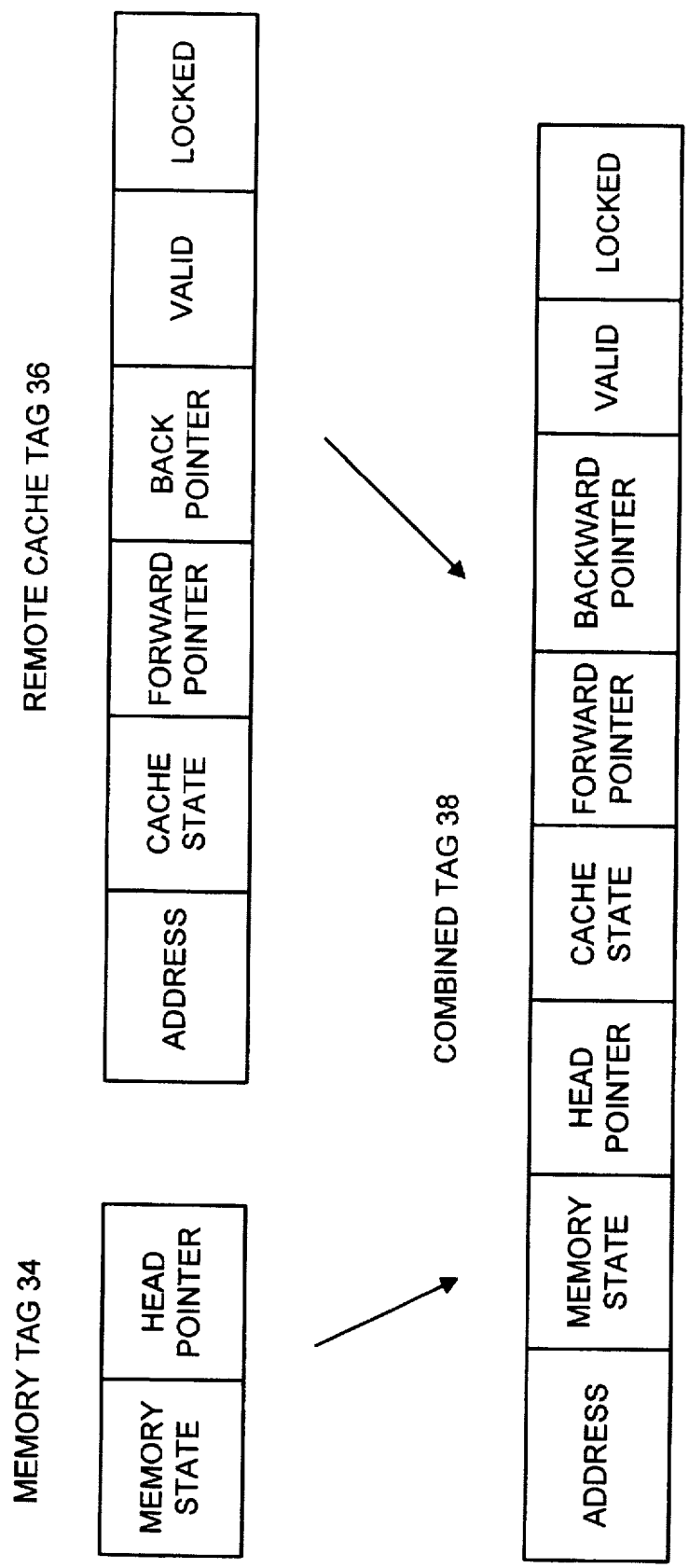
FIG. 4 is a diagram showing the fields of a memory tag associated with each local memory block, a cache tag associated with each line of the remote cache, and a combined tag associated with each block of memory being updated in accordance with the invention.

To maintain coherence among the remote caches in the nodes of computer system 10, the system uses a chained directory scheme defined in the SCI protocol. The chained directory is implemented as a doubly linked sharing list that keeps track of which caches share the same data. With this sharing list, remote caches can be notified when the data they share has been changed and thus is no longer valid. FIG. 4 shows the makeup of a remote cache tag 36, which tags are the elements of the sharing list. The remote cache tag is linked into the chained directory to indicate that the node's remote cache 44 contains a copy of the shared data. Tag 36 contains a number of fields including the Address field, which identifies the memory block cached in the remote cache, and the Cache State field, which gives the state of the cache.

Figure 5:
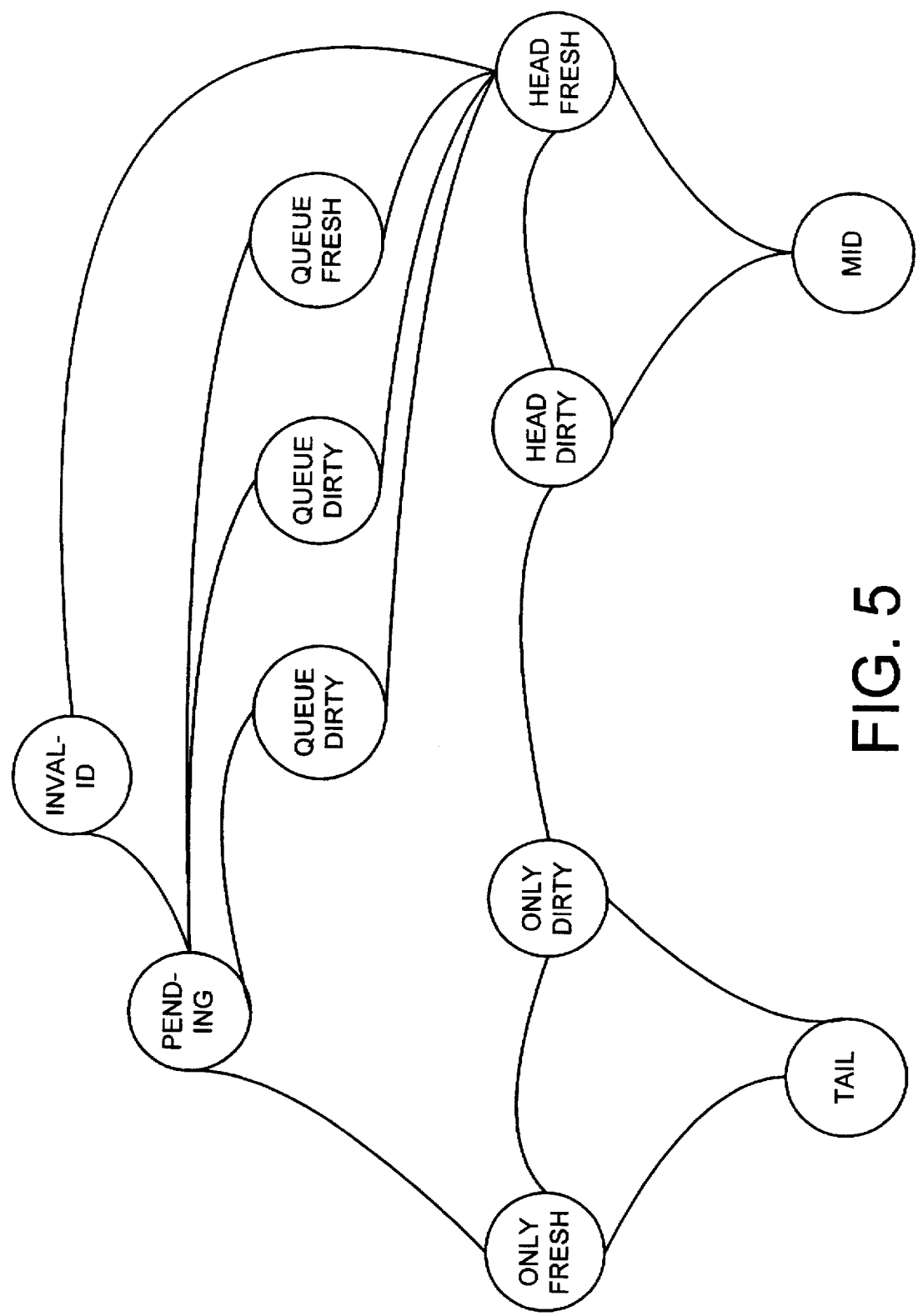
FIG. 5 is a state diagram of the remote cache states in accordance with the invention.

The remote cache states used in the present embodiment are shown in the state diagram of FIG. 5. Table 1 identifies and describes the pertinent cache states.

TABLE 1

| Name | Description |
|---|---|
| CS_INVALID | Line is invalid and can be used for caching new lines |
| CS_ONLY_FRESH | Only cached copy, consistent with memory |
| CS_ONLY_DIRTY | Only cached copy, write-able and inconsistent with memory |
| CS_HEAD_FRESH | Head of fresh list, consistent with memory |
| CS_HEAD_DIRTY | Head of valid list, writ-able and inconsistent with memory |
| CS_MID_VALID | Mid element in valid list, possibly inconsistent with memory |
| CS_TAIL_VALID | Tail of valid list, possibly inconsistent with memory |
| OD_RETN_IN | Only_Dirty block getting off list |
| OD_SPIN_IN | Prepend while getting off list |
| CS_QUEUED_FRESH | Attached to list, notifying old head |
| CS_QUEUED_DIRTY | Attached to fresh list for write, invalidating list |
| CS_PENDING | Waiting for response from home node local memory |
| CS_QUEUED_JUNK | Attached to dirty list, getting data from old head |
| MV_FORW_MV | Rollout from MID, waiting for response from ForwID |
| MV_BACK_IN | Rollout from MID, waiting for response from BackID |
| HD_INVAL_OD | Write to dirty list, invalidating list |
| OF_RETN_IN | Rollout from Only_Fresh, waiting for response from Memory |
| HD_FORW_HX | Rollout from Head_Dirty |
| HD_FORW_OX | List Collapsed during rollout from Head_Dirty |
| OF_MODS_OD | Writing to Only_Fresh list, transitioning to Only_Dirty |
| HF_FORW_HX | Rollout from Head_Fresh |
| HF_FORW_OX | List Collapsed during rollout from Head_Fresh |
| HF_MODS_HD | Write to fresh list, converting list to dirty |
| TO_INVALID | Invalidated while getting off list |
| TV_BACK_IN | Rollout from Tail |
| HX_RETN_IN | Rollout from Head, informing home node local memory of new head | a previous cache in the sharing list, toward the list tail. The Backward Pointer field contains a pointer to a later cache or to a local memory in the sharing list, toward the list head. Elements are added to a sharing list as the head of the list, with the oldest element thus being the tail of the list. The Valid field is set to indicate that the cache tag is valid. The Locked field is set to indicate that this cache tag is to presently remain in the cache tag storage and not be replaced by the cache line replacement algorithm.

The state of local memory 26 is maintained in the memory tags 34. The memory tags store information about the states of the memory blocks, or lines, stored within local memory 26. FIG. 4 shows the composition of a memory tag, one of which is associated with each memory block. The tag has two fields: a Memory State field which indicates the state of the data in the memory block, and a Head Pointer field. Table 2 identifies and describes the pertinent memory states in a memory tag.

TABLE 2

| Name | Description |
|---|---|
| MS_HOME | No sharing list exists and memory is valid |
| MS_FRESH | Sharing list copies are identical with memory |
| MS-GONE | Sharing list copies might be different from memory |
| MS_BUSY | Memory state is being changed |

The Head Pointer field contains a pointer which, if the memory state of the block is GONE or FRESH, points to the node whose remote cache is the head of the sharing list and in which valid data for that memory block is cached.

Table 3 shows typical cache states in a sharing list for a given memory state.

TABLE 3

| Memory | Head | Mid | Tail |
|---|---|---|---|
| MS_HOME | — | | |
| MS_FRESH | CS_ONLY_FRESH | — | — |
| MS_FRESH | CS_HEAD_FRESH | — | CS_TAIL_VALID |
| MS_FRESH | CS_HEAD_FRESH | CS_MID_VALID | CS_TAIL_VALID |
| MS_GONE | CS_ONLY_DIRTY | — | — |
| MS_GONE | CS_HEAD_DIRTY | — | CS_TAIL_VALID |
| MS_GONE | CS_HEAD_DIRTY | CS_MID_VALID | CS_TAIL_VALID |

Returning to FIG. 4, the other fields are well defined in the SCI protocol. The Forward Pointer field contains a pointer to Note that the cache state also reflects the location of the cache in the sharing list: head, midpoint, or tail.

With this as background, the structure and operation of interconnect device 30 can now be understood by way of example. If a processor 24 in node 12 requests data, the request is first reviewed by snoopy cache protocol engine 32. The protocol engine compares the address of the requested data with the memory tags 34 and remote cache tags 36 to determine if the data is stored in the node. If the data's address is in local memory, then node 12 is the home node for the memory block containing the data. A memory tag 34 exists and indicates whether the data is valid and, if not, indicates through the head pointer on which node the valid data can be found. If the data's address is not in local memory 26, there is no memory tag 34 for it. However, if a copy of the data has previously been stored in remote cache 44, then a cache tag 36 exists in the node for the data. The tag 36 indicates whether the data is valid and, if not, on which node the valid data can be found.

If the processor request is a write, the protocol engine 32 again reviews the address to determine if a memory tag 34 or cache tag 36 exists in the node for the address. The procedure is the same as for the read, except that any sharing list containing the data to be changed by the write is invalidated. If the data to be changed is already in remote cache 44, then the node is already on a sharing list. Unless the node is already the head of the list, it must first be removed and then made the head before the list is invalidated. Protocol engine 40 on node 12 sends a message to the node "below" it on the list, passing its backward pointer so that the node below now points to the node "above" node 12. Protocol engine 40 then sends a message to the node above, passing its forward pointer so that the node above now points to the node below. Node 12 is now off the sharing list. Protocol engine now sends a message to the home node for the data being changed, indicating that it wants to be head of the list and be allowed to write the memory block containing the data. The home node responds by setting its head pointer to point to node 12, changing its memory state to GONE, and returning the requested data in the memory block and the pointer to the old head of the current sharing list for the memory block. Finally, protocol engine 40 sends a message to the old head informing the old head that it is no longer the head. Protocol engine proceeds to invalidate the list by sending the appropriate command to each node in the list, in turn. The cache state of tag 36 in node 12 for this memory block is now ONLY_DIRTY, since it is presently the only element of the list. If processors in other nodes read this data, these nodes will be added to the list and the state of tag 36 will change to TAIL.

Messages are sent between nodes through the memory & remote cache protocol engine 40 and interconnect controller 42 in standard SCI format. Engine 40 puts together the appropriate SCI packet and passes it to controller 42 for sending to the desired node. The interconnect controller provides the SCI-compliant link-level interface to the other nodes of system 10. It also contains the link-level queues and the associated arbitration, queue mechanisms, and error checking to provide SCI-packet delivery services for the node.

Returning to the example, if the requested data is not in remote cache 44 or local memory 26, the snoopy cache protocol engine 32 passes the data request to remote cache protocol engine 40. Engine 40 then sends the request in the manner described via controller 42 to the home node for the data, such as node 14. The memory tag for the requested memory line in node 14 is checked to determine if the data stored in memory is valid (HOME or FRESH). If so, node 14 returns a copy of the data to node 12. The memory tag's head pointer in node 14 is changed to point to remote cache 44 on node 12 as the new head of the list of nodes sharing the data. If the processor request from node 12 is for a possible write, the tag's memory state is also changed, to GONE.

The data retrieved from node 14 is sent to node 12 and provided to the processor as well as stored in remote cache 44. A remote cache tag 36 is then created for the stored data. At this point, the address of the retrieved memory block, the cache state and the backward pointer (the node where the memory from which the data was retrieved is located, here node 14) are known and these fields in the cache tag 36 in node 12 are completed. If the processor request is a write, then remote cache 44 is now the head of a new sharing list and there is no forward pointer to other list elements. If the processor request is a read and the memory state is FRESH (indicating at least one remote cache has a valid copy of the memory's data line), then the tag's forward pointer is set to point to the node having the valid copy.

The list will grow as other nodes obtain copies of the data in remote cache 44. For example, if node 14, 16 or 18 requests the same data now in the remote cache of node 12, the requesting node becomes the head of the list. The backward pointer for the remote cache tag in node 12 changes from pointing to the node whose memory contains the data to pointing to the new list head.

Sharing lists of caches are maintained so that all nodes that share the same data can be notified when the shared data is changed. For example, assume that a sharing list for a certain memory block located in local memory of node 18 is headed by node 14 and also contains node 12 and node 16. If a processor 24 in node 12 now writes to this block in its remote cache 44, then the other nodes on the sharing list are notified to invalidate their copies of the data and the list is dissolved. Node 18 is also notified to change the memory state for the memory block to GONE. The head pointer for the memory tag in node 18 for this memory block is changed to point to node 12. A new list is created, with node 12 as the only element.

The SCI cache coherency scheme outline above works well to maintain coherency among the remote caches of the various nodes of system 10. The scheme, however, has a problem: it does not provide a means for allowing a local memory to efficiently update its data when that data has been changed in a remote node. The problem arises when data in local memory 26 is modified in a remote node, rendering the memory's copy of the data invalid, and then a processor 24 requests the now-invalid data from the local memory. With the SCI scheme, memory tags 34 indicate to snoopy cache protocol engine 32 that the memory's copy of the data is invalid. The processor must be then obtain the data from the remote node and store it in its node's remote cache 44. Consequently, remote cache 44 ends up storing data that could just as well be stored in local memory 26 without consuming the limited cache storage. But under the SCI scheme the local memory is not updated until some time later, when the cache line is moved from the cache to local memory according to the cache's block replacement algorithm.

The invention solves this problem by efficiently allowing memory blocks within local memory to act as though they are stored both in memory and in the remote cache from the viewpoint of the SCI protocol. When a home node needs to reacquire a copy of a memory block stored in its local memory, the node attaches itself to the head of the linked sharing list. While the node is attached to the sharing list it maintains the cache state, forward and backward pointers, memory state and head pointer. The home node does this through protocol engine 40 which creates a combined tag, shown in FIG. 4. from the memory tag for the memory block containing the data being updated and a remote cache tag that includes a cache state. This combined tag is stored in tag cache 38 and is maintained until local memory 26 has obtained a valid copy of the data requested by processor 24. Tag cache 38 stores a limited number of combined tags such as twelve, and uses a conventional cache block replacement algorithm to maintain the cache entries.

Figure 6:
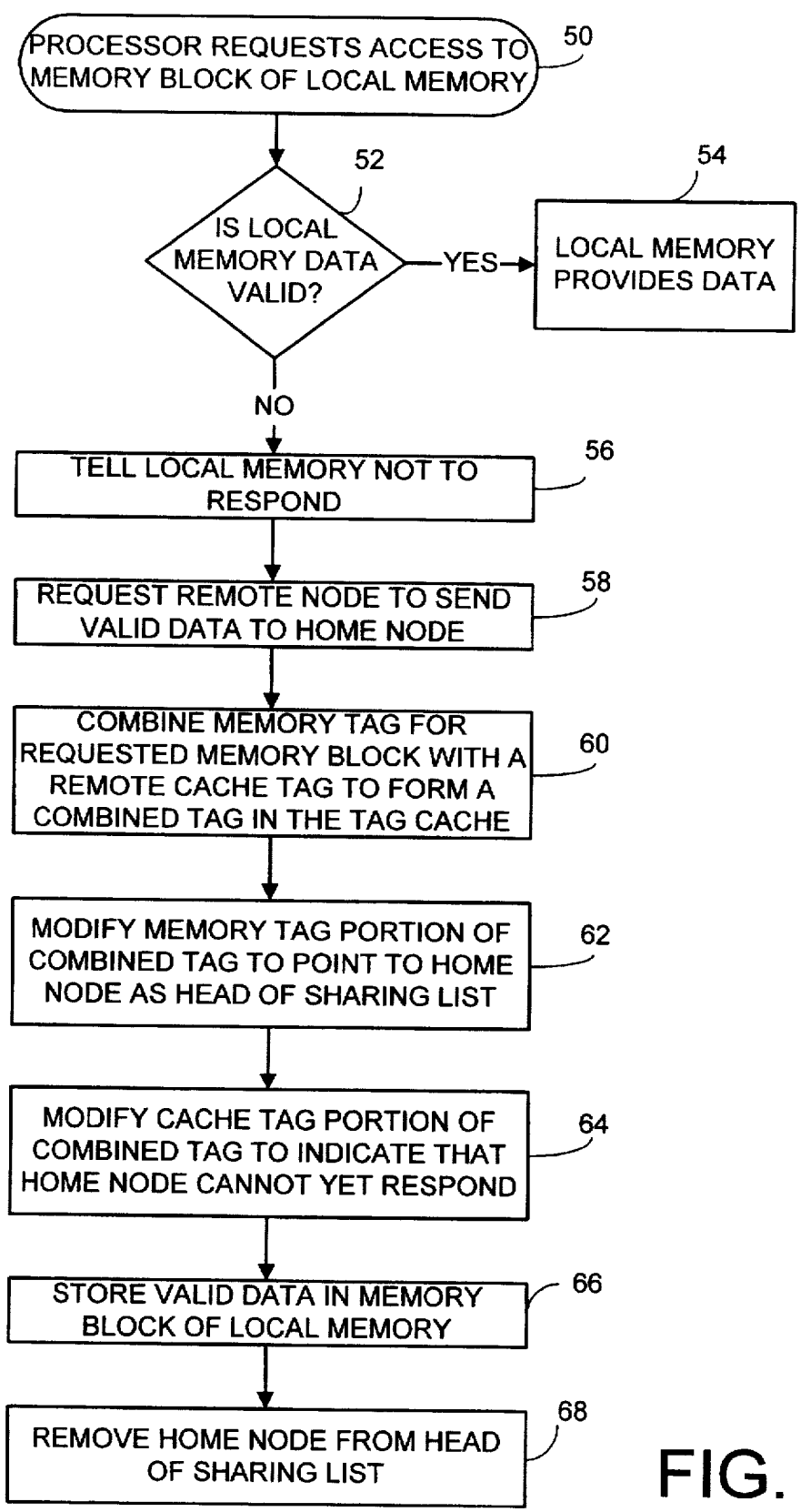
FIG. 6 is a flowchart of a method of updating local memory in accordance with the invention.

FIG. 6 is a flowchart that illustrate how the method of the invention works in the preferred embodiment. Local processor 24 requests access to a local memory block (50). In response snoopy cache protocol engine 32 checks memory tags 34 for the local memory block to determine if the data presently stored therein is valid (52). If the data is valid (HOME or FRESH), engine 32 notifies local memory 26 to provide the requested data to the processor (54). If the data is invalid (GONE), then engine 32 signals the local memory not to respond (56).

To retrieve the valid data, engine 32 passes the data request up to the memory & remote cache protocol engine 40. Engine 40 then looks at memory tag 34 for the memory block containing the data to determine which remote node is the present head of the sharing list for the block. The engine then sends a request via controller 42 to the present head requesting the data and notifying the head that the home node is now head of the list (58). Protocol engine also constructs a combined cache tag that includes a copy of memory tag portion 34 for the memory block and a blank cache tag portion 36. The combined tag is placed in tag cache 38, which holds a limited number of such tags (60). The memory tag portion is then modified to point to the home node as the head of the list (the memory state is still GONE) (62). The cache tag portion is then modified to indicate that the cache is in a state where it has sent a data request but has not yet received the data (64). In the SCI protocol this cache state is labeled QUEUED_JUNK. The other fields of the cache tag portion are then completed by engine 40 as if the memory block were stored in a remote cache. The forward pointer is changed to point to the old head of the list. The address is the memory block address. The backward pointer is changed to also point to the home node. The Valid field is set to indicate that the combined tag is valid. The Locked field is set to indicate that this combined tag is to remain presently in tag cache 38 and not be replaced by the cache line replacement algorithm.

While these steps are occurring the former head of the list responds to the data request from the home node according to the SCI protocol. In the simplest case the former head supplies the data. In more complex cases, the former head notifies the home node that the valid data is now stored somewhere else. In any case, eventually the valid data is sent to the home node per the SCI protocol. The received valid data is passed from controller 42 through engine 40 to snoopy protocol engine 32, which provides it to the requesting processor and stores the valid data in the local memory block of local memory 26 (66).

With the local memory now updated, engine 40 changes the cache state of the combined tag from HEAD_DIRTY to HEAD_FRESH and proceeds to remove the home node from the head of the list (68). Removal is done according to the standard SCI protocol for this step. Engine 40 sends a message to the former head of the list informing that node that it is again head of the list. Once the home node receives a positive response to this message, engine 40 changes the head pointer in the memory tag portion of the combined tag to point to the former head and changes the remote cache state in the cache tag portion to invalid. The combined tag is then unlocked so that it can be removed from tag cache 38 when the storage it occupies is required for another combined tag.

Simultaneously with the steps above, the home node sends a message to the former head, which is now the head of a fresh list. The memory state in the memory tag portion is changed from GONE to FRESH, indicating that the memory is current and that the data also is stored in the head of the list. This update to the memory tag portion of the combined tag is also written through to the external memory tag 34 because the combined tag will eventually be replaced in tag cache 38.

Figure 7:
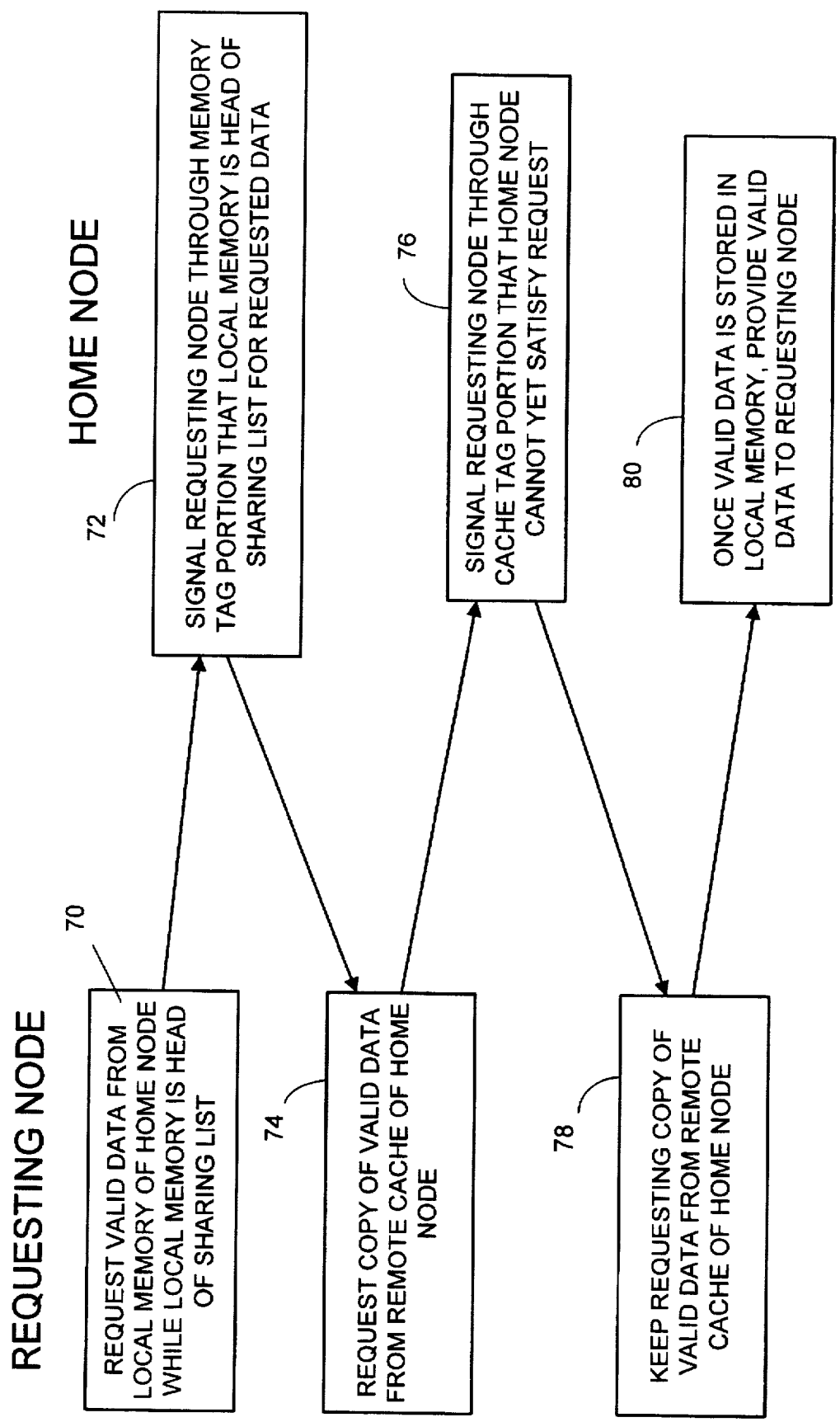
FIG. 7 is a flowchart of how the combined tag is used to allow the protocol engine to behave as both a memory controller and a cache controller in response to communications from other nodes.

The purpose for this procedure is to maintain the SCI protocol in the process of updating the local memory. The combined tag is created because the only way for the protocol engine 40 to obtain a copy of the valid data under the SCI protocol is to behave like a remote cache controller and use the remote cache protocol. At the same time the combined tag allows the engine 40 to behave like the local memory controller if a request comes in for the memory block while the update is in process. FIG. 7 illustrates this dual behavior of the invention under the SCI protocol. Requests for data are first directed to the home node whose local memory contains the data's address (70). The home node responds to the request by signaling to the requesting node that the home node is the head of a sharing list for the requested memory block (72). In doing so, the home node provides the requesting node with its memory state (GONE) and head pointer to the current head of the list (itself). The home node also changes the head pointer in its memory tag portion to point to the requesting node (as the future head of the list). The requesting node, in interpreting the message from the home node, then follows with a request to the home node for a copy of the data from the node's remote cache (74). The protocol engine 40 of the home node looks at this request, determines the current cache state from the combined tag (QUEUED_JUNK) and sends a response back indicating that the response cannot yet be satisfied (the data has not yet arrived, try later) (76). The requesting node then continues to request a copy of the data from the home node's remote cache (78). Eventually the home node meets the request once its local memory is updated by sending a copy of the data. The data, however, comes from the home node's newly updated local memory 26 rather than from its remote cache 44.

Having illustrated and described the principles of the invention in a preferred embodiment, it should be apparent to those skilled in the art that the preferred embodiment can be modified in arrangement and detail without departing from such principles. For example, many of the software aspects of the embodiment may be implemented in hardware and visa versa, and the invention may be used with network interfaces other than SCI. In view of the many possible embodiments to which the principles of the invention may be applied, it should be recognized that the illustrated embodiment is only a preferred example of the invention and should not be taken as a limitation on the scope of the following claims. I claim as the invention all that comes within the scope of these claims.

I claim:

1. In a computer having a number of nodes at least one of which is a home node that includes a processor, local memory and a remote cache, a method of updating data stored in the local memory when valid data for the local memory is stored in a remote node, the method comprising the following steps:

combining on the home node a cache tag of the remote cache including a cache state with a memory tag for a memory block containing the data being updated to form a combined tag;

storing on the home node the combined tag in a tag cache;

in response to a request from a remote node to the local memory on the home node for the valid data, providing information in the memory tag portion of the combined tag; and in response to a request from a remote node to the remote cache on the home node for the valid data, providing information in the cache tag portion of the combined tag.

2. The method of claim 1 wherein the request from the remote node is made in accordance with an SCI protocol.

3. In a computer having a number of nodes at least one of which is a home node that includes a processor, local memory and a remote cache, a method of updating data stored in the local memory when valid data for the local memory is stored in a remote node, the method comprising the following steps:

requesting the remote node to send a copy of the valid data to the home node;

combining on the home node a cache tag of the remote cache including a cache state with a memory tag for a memory block containing the data being updated as portions of a combined tag, the combined tag tracking the states of the local memory and remote cache;

storing on the home node the combined tag in a tag cache;

modifying the combined tag to reflect current states of the local memory and remote cache; and once the valid data is received from the remote cache of the other node, storing the valid data in the local memory.

4. The method of claim 3 wherein the modifying step includes:

modifying the memory tag portion of the combined tag to point to the home node as the head of a sharing list; and modifying the cache tag portion of the combined tag to indicate a cache state in which the home node is obtaining the valid data.

5. The method of claim 3 including:

in response to a request from a remote node to the local memory on the home node for the valid data, providing the information in the memory tag portion of the combined tag; and in response to a request from the remote node to the remote cache on the home node for the valid data, providing the information in the cache tag portion of the combined tag.

6. The method of claim 3 including updating the memory tag portion to indicate that the data stored in the local memory is valid.

7. The method of claim 3 wherein the memory tag portion includes a memory state of the requested data.

8. The method of claim 7 including, after storing the valid data in the local memory, changing the memory state of the memory tag portion to indicate that the data in the local memory has been updated.

9. The method of claim 3 wherein the cache tag portion includes a pointer for indicating to other nodes that the home node is the head of a sharing list for the data.

10. The method of claim 9 including, after storing the valid data, changing the pointer in the combined tag to indicate that the home node is no longer head of the sharing list for the data.

11. In a computer having a number of nodes at least one of which is a home node including a processor, local memory and a remote cache, an apparatus for updating data stored in the local memory when valid data for the local memory is stored in a remote cache of another node, comprising:

a protocol engine for combining on the home node a cache tag of the remote cache of the home node with a memory tag for a memory block containing the data being updated as portions of a combined tag; and a tag cache on the home node for storing the combined tags, a combined tag providing, in response to a request from a remote node to the local memory on the home node for the valid data, information in the memory tag portion of the combined tag and providing, in response to a request from a remote node to the remote cache on the home node for the valid data, information in the cache tag portion of the combined tag.

12. The apparatus of claim 11 wherein the protocol engine includes a cache controller and a memory controller.

13. The apparatus of claim 11 wherein the request from the remote node is made in accordance with an SCI protocol.

14. In a computer having a number of nodes at least one of which is a home node including a processor, local memory and a remote cache, an apparatus for updating data stored in the local memory when valid data for the local memory is stored in a remote cache of another node, comprising:

storage for memory tags for each block of local memory, a memory tag including a memory state and a pointer;

storage for cache tags for each cache line stored in the remote cache of the home node, the cache tags including a cache state;

a protocol engine for combining a cache tag of the remote cache of the home node with a memory tag as portions of a combined tag; and a tag cache for storing the combined tags, a combined tag enabling the protocol engine to act as a cache controller for requesting the valid data from the other node and as a memory controller for responding to requests for the data while it is in the process of being obtained.

15. The apparatus of claim 14 wherein a request by the protocol engine and a response by the protocol engine is made in accordance with an SCI protocol.

16. In a computer having a number of nodes at least one of which is a home node that includes a processor, local memory and a remote cache, a method of updating data stored in the local memory when valid data for the local memory is stored in another node, the method comprising the following steps:

requesting the other node to send a copy of the valid data to the remote cache of the home node;

once the valid data is received from the other node, storing the valid data in the local memory of the home node; and indicating that the valid data is stored in the local memory of the home node.

17. The method of claim 16 wherein the request to the other node for the valid data is made in accordance with an SCI protocol.

18. The method of claim 16 wherein the valid data is stored in the local memory without affecting the remote cache of the home node.

19. The method of claim 16 wherein, if another node requests the valid data from the local memory of the home node before it is stored therein, indicating, in response to a request for the valid data from the local memory, that the valid data is stored in the remote cache of the home node; and indicating, in response to a request for the valid data from the remote cache, that the valid data has yet to arrive.

20. The method of claim 16 including indicating that the valid data is also stored in the remote cache of another node.

* * * * *